(No Model.)
M. F. DUNCAN & R. E. COYLE.
COTTON, CORN, AND TOBACCO FENDER.
No. 290,009. Patented Dec. 11, 1883.
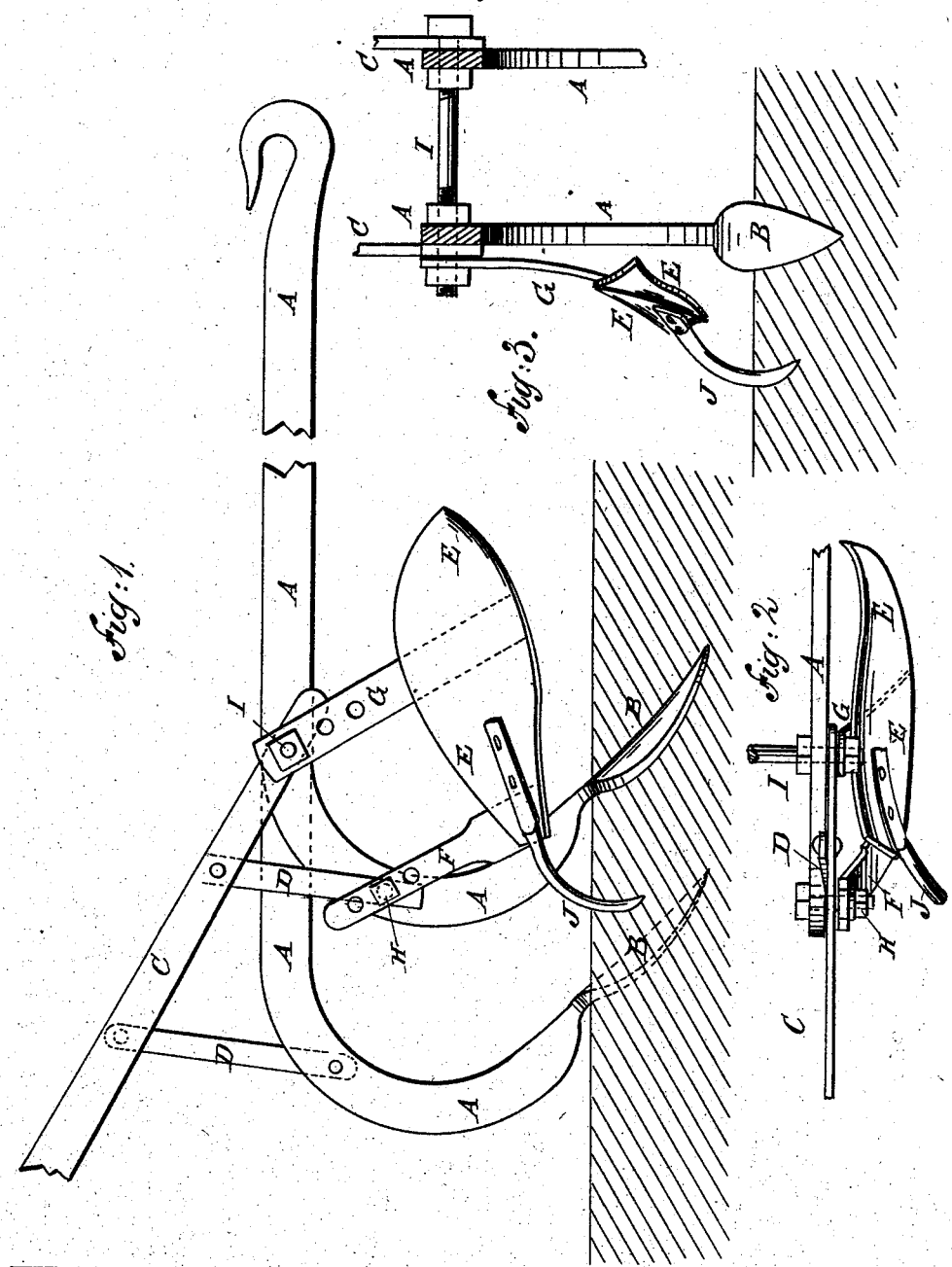
WITNESSES:
Chas. Nida
C. Sedgwick
INVENTOR:
M. F. Duncan
R. E. Coyle
BY Munn & Co
ATTORNEYS.

UNITED STATES PATENT OFFICE.

MASON FRANK DUNCAN AND ROBERT ELIHU COYLE, OF MAY'S LICK, KY.

COTTON, CORN, AND TOBACCO FENDER.

SPECIFICATION forming part of Letters Patent No. 290,009, dated December 11, 1883.

Application filed September 26, 1883. (No model.)

*To all whom it may concern:*

Be it known that we, MASON FRANK DUNCAN and ROBERT ELIHU COYLE, of May's Lick, in the county of Mason and State of Kentucky, have invented a new and Improved Cotton, Corn, and Tobacco Fender, of which the following is a full, clear, and exact description.

Reference is to be had to the accompanying drawings, forming part of this specification, in which similar letters of reference indicate corresponding parts in all the figures.

Figure 1 is a side elevation of our improvement. Fig. 2 is a plan view of a part of the same. Fig. 3 is a front elevation of a part of the same, the plow-beams being shown in section.

The object of this invention is to provide a simple and effective means for raising the leaves of cotton, corn, and tobacco plants while soil is being thrown around the stalks of the said plants by the plow.

The invention consists in a cotton, corn, and tobacco fender having its forward end pointed and curved inward and its rear end curved outward and upward, and provided with bars for connecting the said fender to any plow. To the rear end of the fender is attached an outwardly-inclined hook to remove grass and weeds and loosen the soil close to the plants, as will be hereinafter fully described.

A represents the plow-beams, B the plows, C the handles, and D the handle-supporting braces, of an ordinary plow.

E is the fender, which is made in the form of a plate, having its forward end pointed and curved inward slightly, as shown in Figs. 2 and 3. The rear end of the fender is made with a slight upward and outward curve or twist, in the manner of a mold-board.

To the inner side of the fender E are secured, by rivets or other suitable means, the lower ends of two bars, F G. The rear bar, F, is secured to the plow-beam A or to the handle-supporting brace D by a bolt, H. The forward bar, G, is secured to the plow-beam A by a bolt, I, which may be the bolt that connects the plow-beams A, or a separate bolt, as may be desired. Several holes are formed in the upper parts of the bars F G, to receive the fastening-bolts H I, so that the fender E can be adjusted higher or lower, according as the plants may be larger or smaller and as it may be desired to throw more or less soil around the stalks of the plants.

To the rear end of the fender E is secured, by bolts or rivets, the shank of a hook, J, which inclines outward and downward, so as to work close to the plants to remove grass and weeds and to loosen the soil. With this construction, as the plow is drawn forward the fender E passes beneath and raises the leaves of the plants, so that the said leaves will not be covered with soil. In case some of the leaves escape the fender E and become covered with soil, the hook J will draw said leaves from beneath the soil, and thus free them from the said soil.

In attaching the fender, the bolt H may pass through the handle of a wooden-framed plow, the rear bar, F, being attached to the fender E with one bolt or rivet, allowing the said bar to be moved forward or backward, as may be required, to adjust the said bar to the plow. The forward bar, G, can be attached to any plow by passing the bolt I through the plow-beam.

Having thus described our invention, we claim as new and desire to secure by Letters Patent—

1. A cotton, corn, and tobacco fender, E, made, substantially as herein shown and described, with its forward end pointed and curved inward slightly and its rear end curved outward and upward, to adapt it to raise the leaves of the plants while allowing soil to be thrown around the stalks of the said plants, as set forth.

2. The combination, with the plow-beam A, of the fender E, constructed as described, and the supporting-bars F G, substantially as and for the purpose set forth.

MASON F. DUNCAN.
ROBERT ✕ E. COYLE.
his
mark.

Witnesses:
M. W. COULTER,
M. F. MARSH.